May 21, 1963 — W. A. CROWLEY — 3,090,327
HYDRO-AIR VEHICLE
Original Filed Sept. 29, 1958
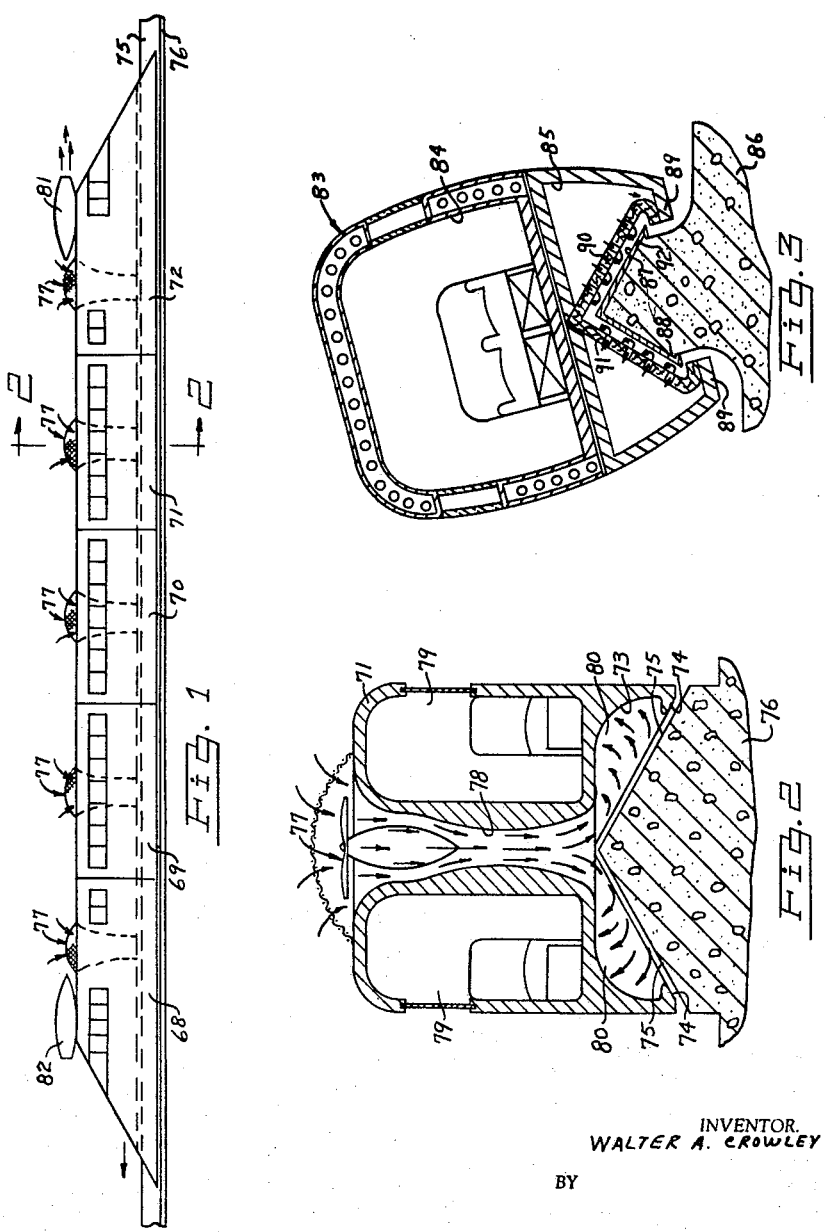
INVENTOR.
WALTER A. CROWLEY
BY
ATTORNEYS

United States Patent Office 3,090,327
Patented May 21, 1963

3,090,327
HYDRO-AIR VEHICLE
Walter A. Crowley, Royal Oak, Mich., assignor, by mesne assignments, to Carwill Enterprises, Incorporated, Daytona Beach, Fla., a corporation of Florida
Original application Sept. 29, 1958, Ser. No. 763,919. Divided and this application Oct. 3, 1961, Ser. No. 149,800
14 Claims. (Cl. 104—134)

The present invention concerns divisional subject matter of my copending application Serial No. 763,919, filed September 29, 1958, and relates more particularly to novel vehicles which travel on air cushions or air bearings along a track.

It is the primary object of this invention to provide a vehicle having a body provided with a hollow downwardly open pressure chamber on the bottom thereof and which vehicle has pressurizing means to maintain pressurized air inside the chamber, whereby the pressurized air raises the vehicle upward to follow a track, and the vehicle floats on the pressurized air or air cushion; and, wherein the vehicle is further provided with horizontal propulsion means for the vehicle to propel itself along the track on a bearing of air.

It is another object of this invention to provide a vehicle of the class described, which is simple, lightweight and compact in construction, with very few moving parts, safe and simple to operate, economical of manufacture, and which provides a smooth, fast mode of transportation.

It is a further object of this invention to provide a vehicle adapted to follow a track, which vehicle may be made in different embodiments depending upon the purpose for which it is to be used, as for example, for commercial, passenger or cargo use.

It is still another object of this invention to provide a vehicle of the class described which is self-limiting in altitude and which is possessed of excellent stability in roll and pitch.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a side elevational view of a hydro-air train embodying the principles of the invention;

FIG. 2 is an elevational sectional view of the structure illustrated in FIG. 1, taken along the line 2—2 thereof, and looking in the direction of the arrows;

FIG. 3 is an elevational sectional view similar to that of FIG. 2, and showing a slightly modified hydro-air train construction.

Referring now to the drawings, and in particular to FIGS. 1 and 2, wherein is illustrated an actual working embodiment of the invention, the hydro-air train comprises a front thrust engine and fuel car 68, the intermediate cars or sections 69, 70 and 71, and the rear thrust engine and fuel car 72. FIG. 2 illustrates the typical cross-section of the cars 68, 69, 70, 71 and 72. As shown in FIG. 2, each of these cars is provided with a hollow pressure chamber or gas enclosure, as 73 along the bottom thereof, which is open along the lower side thereof. The lower edges of the side walls of the pressure chamber 73 are tapered as at 74 so as to seat on the opposed downwardly and outwardly inclined faces 75 of the concrete roadway 76 and keep the train laterally on the roadway when the train is at rest.

Each car of the train is provided with a suitable lift means as 77 which, as shown, is an engine driven propellor means, although it will be obvious that the lift means 77 could be any suitable lift means as, for example, a turbine engine or a suitable air compressor. As shown in FIG. 2, the lift means forces air under pressure downwardly through the duct or conduit 78 into the compression chamber 73 which extends the entire length of the car. The compression chamber 73 in each car is provided with suitable end walls as 80, at each end thereof and these end walls each have opposed downwardly and outwardly inclined edges to receive the opposed faces 75 of the roadway or track thus for closing the ends to the track and keeping the vehicle laterally on the track when the vehicle is at rest. The numerals 79 indicate the passenger or work carrying area of each car. The rear engine car 72 is provided with a propulsive thrust power means as 81, which is a jet engine, although other types of thrust power means could be used. The front engine car 68 is provided with a second jet engine 82 for reverse thrust and stopping purposes.

The lift engines 77 provide each car with an individual lifting affect so as to lift it off of the concrete roadway into a hovering position a few inches above the roadway as shown in FIG. 2. The thrust engines 81 and 82 could then be operated to propel the train in the desired direction. It will be seen that a hydro-air train of the type disclosed rides on an air bearing between the track 76 and the train itself. A train of this type would be economical to operate at high speed due to the frictionless design of the structure thereof since it has no wheels to wear out, and may travel safely at very high speeds. The track 76 would be cheap to build and would be self-cleaning and have a long life. In a train of this type, there is no wear on the track or the train's under-surface other than slow errosion due to compressed turbulent air and blown particles because the train rides on a film of compressed air and has no metal-to-metal contact between the train and the track. Since a train of this type has no wheels there are now moving mechanical parts between the track and the train which would be subject to failure due to centrifugal forces or other causes. The friction losses in a train of this type would be very low since losses by turbulence of air would be the only losses present and these may be minimized by properly contoured smooth parts. A train of this type would have the advantage of low power requirements due to the absence of rolling friction. Other novel features of a train of the present type are that it is capable of safe high speeds, would have low maintainence costs and would provide safe and comfortable transportation. A train of the present type may be used for subway, elevated, or surface routes.

FIG. 3 is an elevational cross-sectional view similar to that of FIG. 2 and showing a modified car construction for a hydro-air train made in accordance with the invention. This modified train construction would include a body 83 having a passenger carrying compartment 84 and an air compression chamber 85 formed in the bottom side thereof. The air compression chamber 85 would extend the entire length of the car in the same manner as the chamber 73 of the embodiment of FIG. 2. In this embodiment the concrete roadway 86 would be provided with the upwardly sloping sides 87 and an outwardly extended lip 88 along each side thereof. The compression chamber 85 would be provided along the lower edges thereof with the under-hanging shoe 89 for safety purposed which would normally make no contact with the lips 88 and which would not restrict the escape of air from the air chamber. The air chamber 85 is provided with the inner walls 90 formed from a suitable brake lining material for engagement with the stainless steel facings 92 on the roadway 86 for stopping purposes in case of an air supply failure at high speed. The walls 90 would be provided with suitable air apertures therethrough as 91 to permit the air to escape from the chamber 85 and form the air bearing between the walls 90 and the roadway 86. The embodiment of FIG. 3 is adapted for high speeds around curves and the compression chamber 85 may be articulated to permit the train to go over hills and around curves. The embodiment of FIG. 3 would operate in the same general manner as the aforedescribed embodiment of FIGS. 1 and 2 and would be provided with a suitable means for compressing air into the chamber 85.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A railway vehicle adapted to raise itself by gas under pressure from a track having opposed side faces and to hold to the course of the track on a bearing formed by the gas between the vehicle and the opposed side faces of the track, said vehicle including hollow downwardly open gas enclosure means so corresponding to the track as to extend over the track and along the opposed side faces of the track to enclose plenum space in the hollow thereof between said enclosure means and the opposed side faces of the track, said plenum space when said gas enclosure means is raised from the track being over the track in communication with the opposed faces of the track while said enclosure means forms a lift gap with the track for gas to escape from said plenum space to the atmosphere, and means for vertically lifting and horizontally propelling the vehicle, the latter said means including pressurizing means on the vehicle communicating with said plenum space for maintaining gas under pressure in said plenum space to lift said vehicle upward only in the region of ground effect of the lift gas upon the track into a horizontally idle hovering position wherein substantially all vertical thrust of the vehicle exerted upon the track by the vehicle is in the downward direction and for the vehicle to stabilize itself laterally of the track by the effect of the lift gas upon the opposed faces of the track with the vehicle forming a lift gap with the track, and said means for verically lifting and horizontally propelling the vehicle further including horizontal propulsion means on the vehicle for the vehicle to horizontally propel itself along the track while said gas pressurizing means maintains gas under pressure in said plenum space and ground effect lift of the vehicle relative to the track for the vehicle to follow the track in gap forming relation to the track.

2. A railway vehicle adapted to raise itself by gas under pressure from a track having opposed side faces and to hold the course of the track on a bearing formed by the gas between the vehicle and the opposed side faces of the track, said vehicle including a bottom so corresponding to the track that said bottom extends over the track and along the opposed side faces of the track to enclose plenum space between said bottom and the opposed side faces of the track, said plenum space when the vehicle is raised from the track being in communication with the opposed faces of the track while said bottom forms a lift gap with the track for gas to escape from said plenum space to the atmosphere, and means for vertically lifting and horizontally propelling the vehicle, said means including pressurizing means on the vehicle communicating with said plenum space for maintaining gas under pressure in said plenum space to lift the vehicle upward only in the region of ground effect of the lift gas upon the track into a horizontally idle hovering position and for the vehicle to stabilize itself laterally of the track by the effect of the lift gas upon the opposed faces of the track, with the vehicles forming a lift gap with the track, and said means for vertically lifting and horizontally propelling the vehicle further including horizontal propulsion means on the vehicle for the vehicle to horizontally propel itself along the track while said gas pressurizing means maintains gas under pressure in said plenum space and ground effect lift of the vehicle relative to the track for the vehicle to follow the track in gap forming relation of said bottom to the track.

3. A vehicle in accordance with claim 2, wherein said vehicle includes a plurality of interconnected railway bodies each having a bottom so corresponding to the track that the bottom of each said body extends over the track and along the opposite side faces of the track to enclose a corresponding fraction of said plenum space between the bottom of said body and the opposite side faces of the track.

4. A vehicle in accordance with claim 2, wherein the vehicle is adapted to follow a track having upwardly facing oppositely inclined sides extending downwardly and outwardly, and said bottom of the vehicle is hollow opening downward to accommodate said plenum space and includes a plurality of portions extending laterally of the vehicle and spaced apart longitudinally of the vehicle, each of said portions having oppositely inclined lower edges substantially conforming to the inclined sides of the track.

5. A vehicle in accordance with claim 2, wherein the vehicle is adapted to follow a track having upwardly facing oppositely inclined sides extending downwardly and outwardly, and said bottom of the vehicle is hollow opening downward to accommodate said plenum space, said bottom including a plurality of portions extending laterally of the vehicle and spaced apart longitudinally of the vehicle, each of said portions having oppositely inclined lower edges substantially conforming to the inclined sides of the track, and said bottom further including oppositely inclined brake shoe members substantially conforming to the inclined sides of the track to support the vehicle on the track when the vehicle is not being lifted and said members haivng openings for gas to issue from said plenum space to the inclined faces of the track for the gas to lift the vehicle from the track.

6. A vehicle in accordance with claim 2, wherein the vehicle is adapted to follow a track having upwardly facing oppositely inclined sides extending downwardly and outwardly and thence inwardly to provide outwardly extending lips, and said bottom of the vehicle is hollow opening downward to accommodate said plenum space, said bottom including a plurality of portions extending laterally of the vehicle and spaced apart longitudinally of the vehicle, each of said portions having oppositely inclined lower edges substantially conforming to the inclined sides of the track, and said bottom further including safety means in-turned beneath the outwardly extending lips of the track so as to remain beneath and clear of the track lips when the vehicle is normally lifted by gas pressure.

7. A railway vehicle adapted to raise itself by gas under pressure from a track having opposed side faces and to hold to the course of the track on a bearing formed by the gas between the vehicle and the opposed side faces of the track, said vehicle including gas enclosure means so corresponding to the track as to extend over the track and along the opposed side faces of the track to enclose plenum space between the vehicle and the opposed side faces of the track and said enclosure means including a plurality of portions extending laterally of the vehicle and spaced apart longitudinally of the vehicle and each of said portions having oppositely inclined edges substantially conforming to the oppositely inclined opposed side faces of the track, said plenum space when said gas enclosure means is raised from the track being over the track in communication with the opposed faces of the track while the vehicle forms a lift gap with the track for gas to escape from said plenum space to the atmosphere, and means for vertically lifting and horizontally propelling the vehicle, the latter said means including pressurizing means on the vehicle communicating with said plenum space for maintaining gas under pressure in said plenum space to lift said vehicle upward only in the region of ground effect of the lift gas upon the track into a horizontally idle hovering position and for the vehicle to stabilize itself laterally of the track by the effect of the lift gas upon the opposed faces of the track with the vehicle forming a lift gap with the track, and said means for vertically lifting and horizontally propelling the vehicle further including horizontal propulsion means on the vehicle for the vehicle to horizontally propel itself along the track while said gas pressurizing means maintains gas under pressure in said plenum space and ground effect lift of the vehicle relative to the track for the vehicle to follow the track in gap forming relation to the track.

8. A vehicle adapted to raise itself by gas pressure from a roadway and travel the roadway, said vehicle including gas enclosure and roadway contact means, said means comprising hollow gas enclosure means having downwardly open plenum space in the hollow thereof, and said gas enclosure and roadway contact means further comprising roadway contact means for the vehicle to be laterally opposed by a track of the roadway and bear upon the roadway when the vehicle is in a rest position, and said vehicle including means for vertically lifting and horizontally propelling the vehicle, the latter said means comprising pressurizing means on the vehicle communicating with said plenum space for maintaining gas under pressure in said plenum space and beneath said gas enclosure means to lift the vehicle upward from a rest position only in the region of ground effect of the lift gas, into a horizontally idle hovering position, wherein substantially all vertical thrust exerted upon the roadway by the vehicle is in the downward direction and wherein said gas enclosure means forms a lift gap with the roadway and said roadway contact means is in uplifted laterally opposed position relative to the track, and said means for vertically lifting and horizontally propelling the vehicle further including horizontal propulsion means on the vehicle for the vehicle to horizontally propel itself along the roadway, while said gas pressurizing means maintains gas under pressure in said plenum space and the vehicle is lifted by the gas and said roadway contact means is laterally opposite the track.

9. A vehicle in accordance with claim 8, wherein said roadway contact means has laterally opposed oppositely inclined faces to engage laterally opposed oppositely inclined faces of the track.

10. A vehicle in accordance with claim 8, wherein said hollow gas enclosure means having downwardly open plenum space in the hollow thereof includes a hollow bottom of the vehicle having downwardly open plenum space therein with which said pressurizing means communicates for the vehicle to be lifted.

11. A vehicle in accordance with claim 8, wherein said roadway contact means for the vehicle to be laterally opposed by a track of the roadway and bear upon the roadway when the vehicle is in a rest position includes portions of said gas enclosure means having faces so suited to the contour of the track that said gas enclosure means is laterally opposed by the track and the vehicle bears upon the roadway when the vehicle is in a rest position.

12. A vehicle in accordance with claim 8, wherein said hollow gas enclosure means having downwardly open plenum space in the hollow thereof includes a hollow bottom of the vehicle having downwardly open plenum space therein with which said pressurizing means communicates for the vehicle to be lifted, and said roadway contact means for the vehicle to be laterally opposed by a track of the roadway and bear upon the roadway includes portions of said bottom having faces suited to the contour of the track so that said bottom is laterally opposed by the track and said faces bear upon the track when the vehicle is in a rest position.

13. A vehicle in accordance with claim 8, wherein said hollow gas enclosure means having downwardly open plenum space in the hollow thereof is adapted to enclose said plenum space substantially to a mono-rail track.

14. A vehicle in accordance with claim 8, wherein said hollow gas enclosure means having downwardly open plenum space in the hollow thereof is adapted to enclose said plenum space substantially to a mono-rail track, and said roadway contact means for the vehicle to be laterally opposed by a track of the roadway and bear upon the roadway when the vehicle is in a rest position includes portions of said gas enclosure means having faces so suited to the contour of the mono-rail track that said gas enclosure means is laterally opposed by the mono-rail track and the vehicle bears upon the roadway when the vehicle is in a rest position.

References Cited in the file of this patent

UNITED STATES PATENTS

| | | |
|---|---|---|
| 936,395 | Worthington | Oct. 12, 1909 |
| 1,000,009 | Jenison | Aug. 8, 1911 |
| 1,053,368 | Eells | Feb. 18, 1913 |
| 1,411,597 | Trask | Apr. 4, 1922 |
| 2,511,979 | Goddard | June 20, 1950 |
| 2,717,744 | Birnbaum | Sept. 13, 1955 |
| 3,013,505 | Burke | Dec. 19, 1961 |